(12) United States Patent
Cismas

(10) Patent No.: US 7,093,094 B2
(45) Date of Patent: Aug. 15, 2006

(54) RANDOM ACCESS MEMORY CONTROLLER WITH OUT OF ORDER EXECUTION

(75) Inventor: Sorin C. Cismas, Saratoga, CA (US)

(73) Assignee: Mobilygen Corporation, Santa Clara, CA (US)

( * ) Notice: Subject to any disclaimer, the term of this patent is extended or adjusted under 35 U.S.C. 154(b) by 310 days.

(21) Appl. No.: 10/215,705

(22) Filed: Aug. 9, 2002

(65) Prior Publication Data

US 2003/0033493 A1   Feb. 13, 2003

Related U.S. Application Data

(60) Provisional application No. 60/311,735, filed on Aug. 9, 2001.

(51) Int. Cl.
*G06F 12/00* (2006.01)

(52) U.S. Cl. .................... 711/169; 711/106; 711/158

(58) Field of Classification Search ............. 711/167, 711/169, 158, 202–207, 106
See application file for complete search history.

(56) References Cited

U.S. PATENT DOCUMENTS

| | | | |
|---|---|---|---|
| 5,564,052 A * | 10/1996 | Nguyen et al. ............. 712/42 |
| 5,809,563 A * | 9/1998 | Yamada et al. ............ 711/207 |
| 5,941,983 A * | 8/1999 | Gupta et al. ............... 712/214 |
| 6,088,772 A * | 7/2000 | Harriman et al. .......... 711/158 |
| 6,145,073 A | 11/2000 | Cismas |
| 6,219,747 B1 | 4/2001 | Banks et al. |
| 6,263,430 B1 * | 7/2001 | Trimberger et al. ............. 713/1 |
| 6,297,832 B1 * | 10/2001 | Mizuyabu et al. .......... 345/540 |
| 6,335,950 B1 | 1/2002 | Kohn |
| 6,456,746 B1 | 9/2002 | Freeman |
| 6,470,433 B1 * | 10/2002 | Prouty et al. ............... 711/168 |
| 6,487,640 B1 * | 11/2002 | Lipasti ...................... 711/140 |
| 6,510,497 B1 | 1/2003 | Strongin et al. |
| 6,564,304 B1 * | 5/2003 | Van Hook et al. .......... 711/154 |
| 6,615,326 B1 | 9/2003 | Lin ............................ 711/154 |
| 2001/0055427 A1 | 12/2001 | Freeman |
| 2002/0199072 A1 * | 12/2002 | Fanning ...................... 711/154 |

OTHER PUBLICATIONS

Kim, Hansoo et al., "High-Performance and Low Power Memory-Interface Architecture for Video Processing Applications," *IEEE Transactions on Circuits and Systems for Video Technology*, IEEE Inc., New York, U.S.A., vol. 11, No. 11, Nov. 2001, pp. 1160-1170.

* cited by examiner

*Primary Examiner*—Matthew Kim
*Assistant Examiner*—Hetul Patel
(74) *Attorney, Agent, or Firm*—Law Office of Andrel D. Popovici, P.C.

(57) ABSTRACT

A memory controller for a multi-bank random access memory (RAM) such as SDRAM includes a transaction slicer for slicing complex client transactions into simple slices, and a command scheduler for re-ordering preparatory memory commands such as activate and precharge in an order that can be different from the order of the corresponding client transactions. The command scheduler may also re-order memory access commands such as read and write. The slicing and out-of-order command scheduling allow a reduction in memory latency. The data transfer to and from clients can be kept in order.

19 Claims, 5 Drawing Sheets

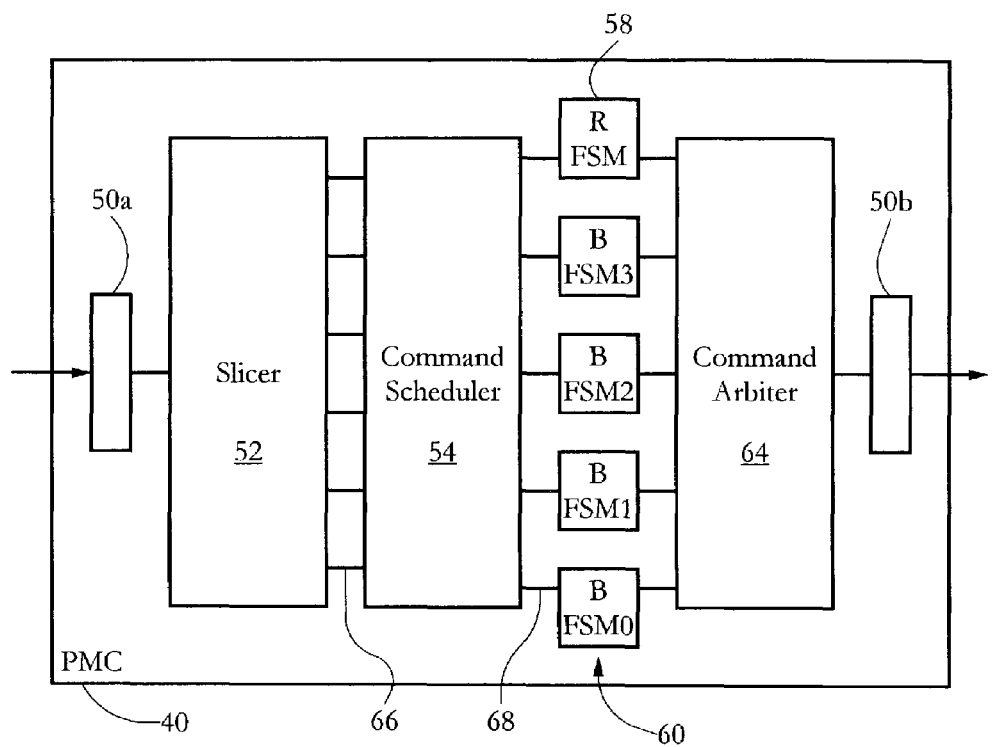
FIG. 3
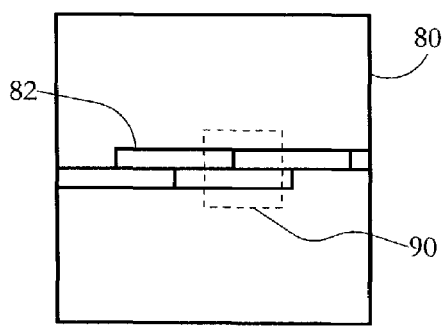
FIG. 4-A
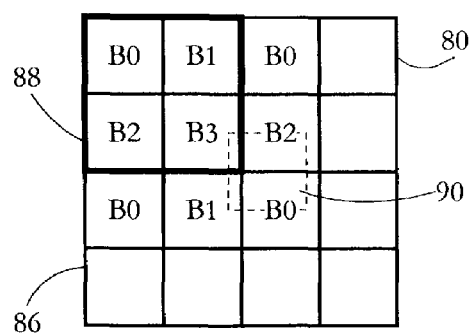
FIG. 4-B

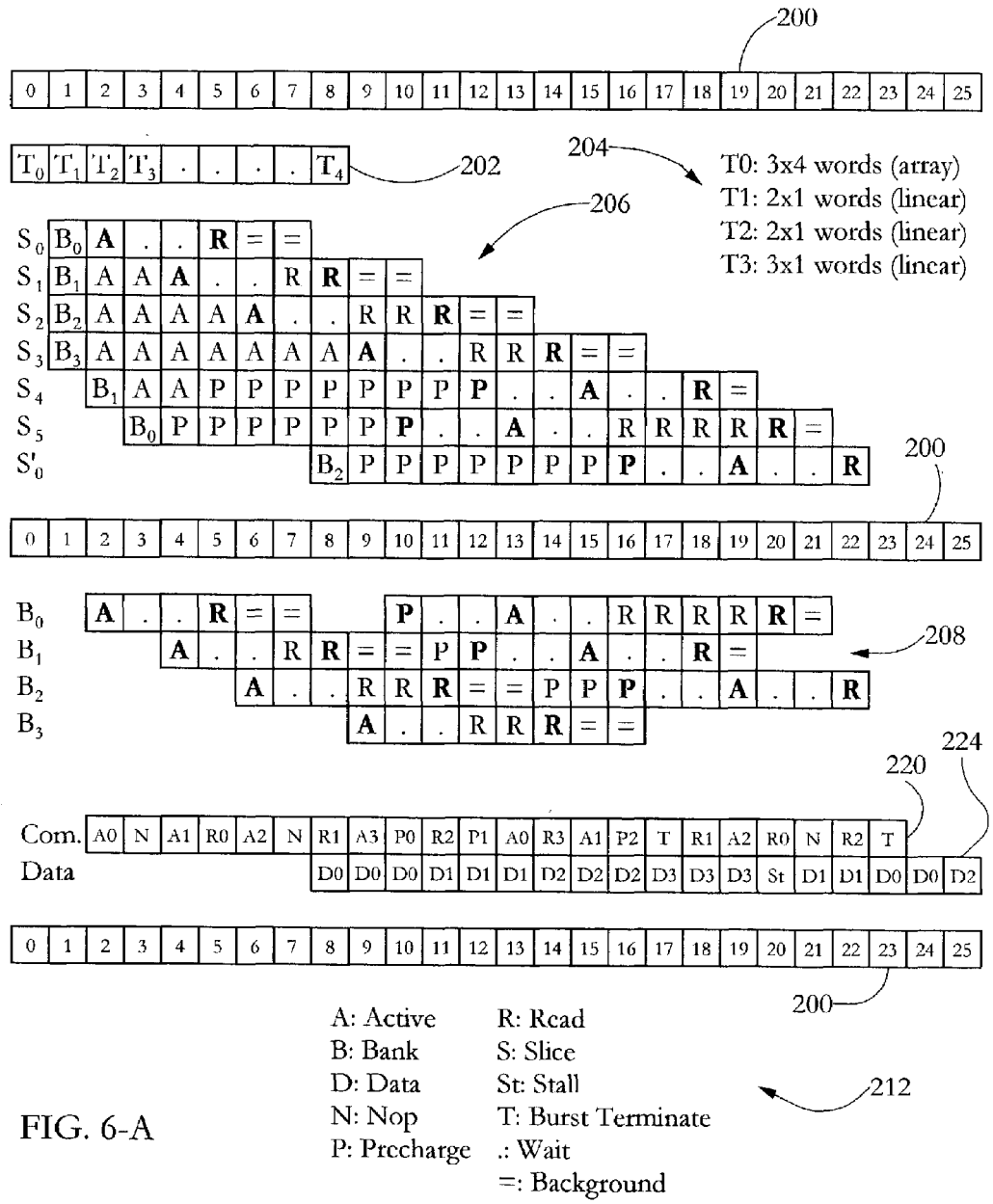
FIG. 6-A
A: Active    R: Read
B: Bank    S: Slice
D: Data    St: Stall
N: Nop    T: Burst Terminate
P: Precharge    .: Wait
               =: Background

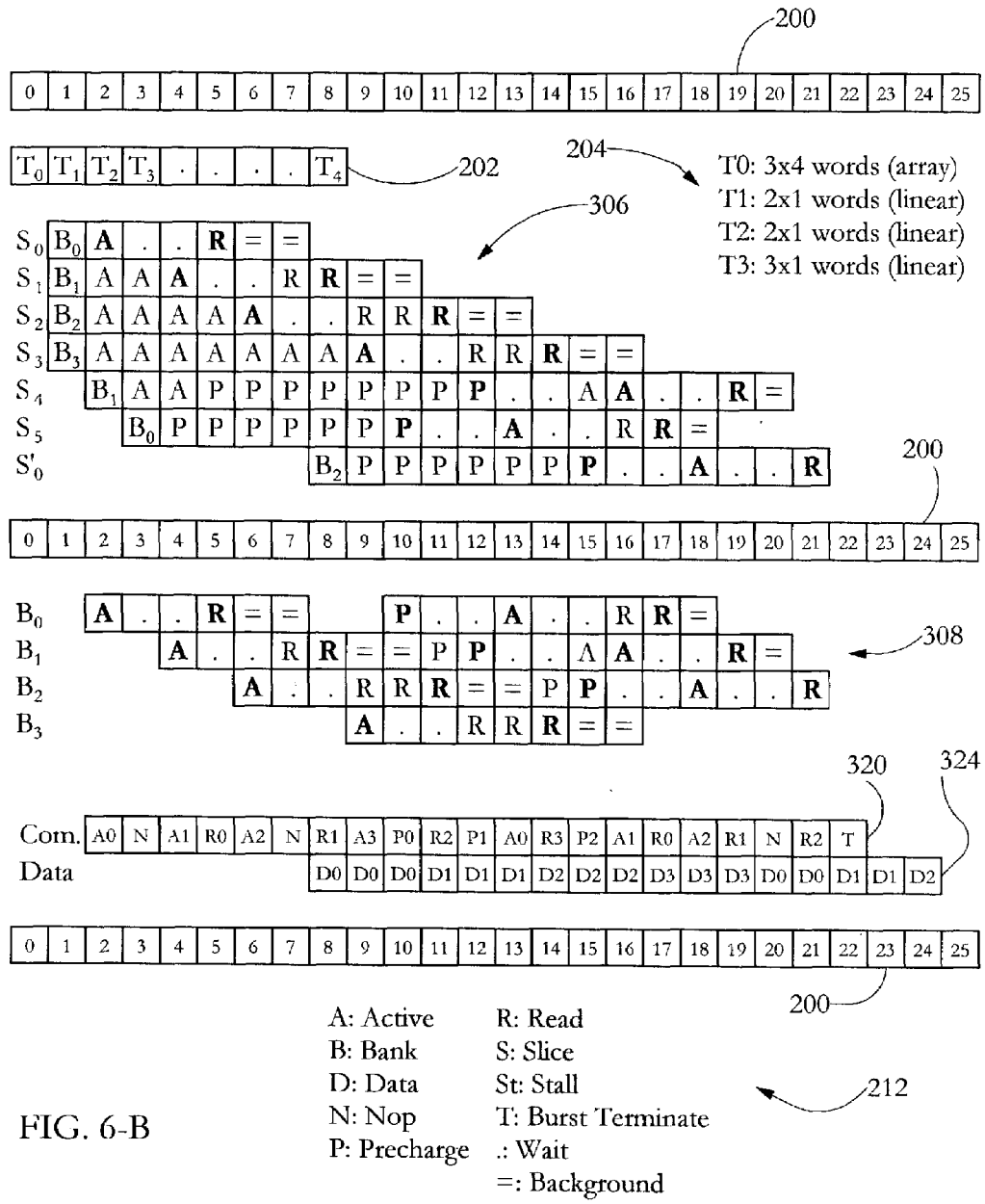
FIG. 6-B

RANDOM ACCESS MEMORY CONTROLLER WITH OUT OF ORDER EXECUTION

RELATED APPLICATION DATA

This application claims the priority date of U.S. Provisional Application No. 60/311,735, filed Aug. 9, 2001, entitled "Superscalar Memory Controller with Out of Order Execution," which is herein incorporated by reference.

BACKGROUND OF THE INVENTION

This invention relates to random access memories (RAM), and in particular to systems and methods for controlling a RAM having multiple data banks.

Data processing systems such as personal computers, digital video players, and wireless communications devices often include multiple data processing clients which share access to random access memory (RAM). Conventional RAM includes static RAM (SRAM) and dynamic RAM (DRAM). Commonly-used DRAM includes synchronous DRAM (SDRAM) such as double-data-rate SDRAM (DDR-SDRAM). Technological improvements have led to great increases in computing speed and RAM capacity. Furthermore, typical systems include increasing numbers of clients sharing access to RAM. In this context, efficient usage of available RAM bandwidth is becoming increasingly important.

Some RAM units, such as typical SDRAM units, can include a plurality of memory banks. Each memory bank comprises an array of memory locations organized in pages (rows). Each memory location within the RAM is characterized by a row (page) address, and a column address. Reading or writing data at a given location within the RAM typically requires a number of pre-read/write memory operations such as activate and precharge. Activate commands open pages within a bank, while precharge commands close the bank. Such operations can involve a latency overhead of a few to tens of clock cycles per read/write transactions. Typically, only one page at a time can be open within any given bank. Consequently, if one or more clients require consecutive access to different pages within the same bank, a significant number of clock cycles can be wasted as the first page is closed and the second page is opened. The latency overhead associated with pre-read/write commands can substantially constrain the utilization of available RAM bandwidth.

SUMMARY OF THE INVENTION

The present invention provides an improved memory controller for a multi-bank random access memory (RAM). In the preferred embodiment, the memory controller includes a transaction slicer for slicing complex client transactions into simple slices, wherein each slice fits within a single page of a memory bank, and a command scheduler for re-ordering preparatory memory commands (such as activate and precharge) in an order different from the client transactions corresponding to the commands. The slicing and out-of-order command scheduling allow a reduction in memory latency. The data transfer to and from clients can be kept in order.

BRIEF DESCRIPTION OF THE DRAWINGS

The foregoing aspects and advantages of the present invention will become better understood upon reading the following detailed description and upon reference to the drawings where:

FIG. 3 shows the preferred internal structure of a physical memory controller component of the memory controller of FIG. 2, according to the preferred embodiment of the present invention.

FIGS. 4-A and 4-B show two possible organizations of a digital video image, according to the present invention.

FIGS. 6-A and 6-B illustrate two exemplary sequences of memory transactions controlled by the physical memory controller of FIG. 3, according to the present invention.

DETAILED DESCRIPTION OF THE INVENTION

In the following description, a pipestage is understood to be a circuit which includes a finite state machine (FSM). A core is understood to be a circuit including plural interconnected pipestages. A set of elements is understood to contain one or more elements. Any reference to an element is understood to encompass at least one element. Any described connection can be a direct connection or an indirect connection through intermediary structures/logic. A complex memory request or command is understood to mean a memory request or command corresponding to more than one memory page within one bank. A simple memory request or command is understood to mean a memory request or command that corresponds to memory addresses within a single page within a bank. The statement that a first request is derived from the second request is understood to mean either that the first request is equal to the second request, or that the first request is generated by processing the second request and (optionally) other data.

The following description illustrates embodiments of the invention by way of example and not necessarily by way of limitation.

Figure 1:
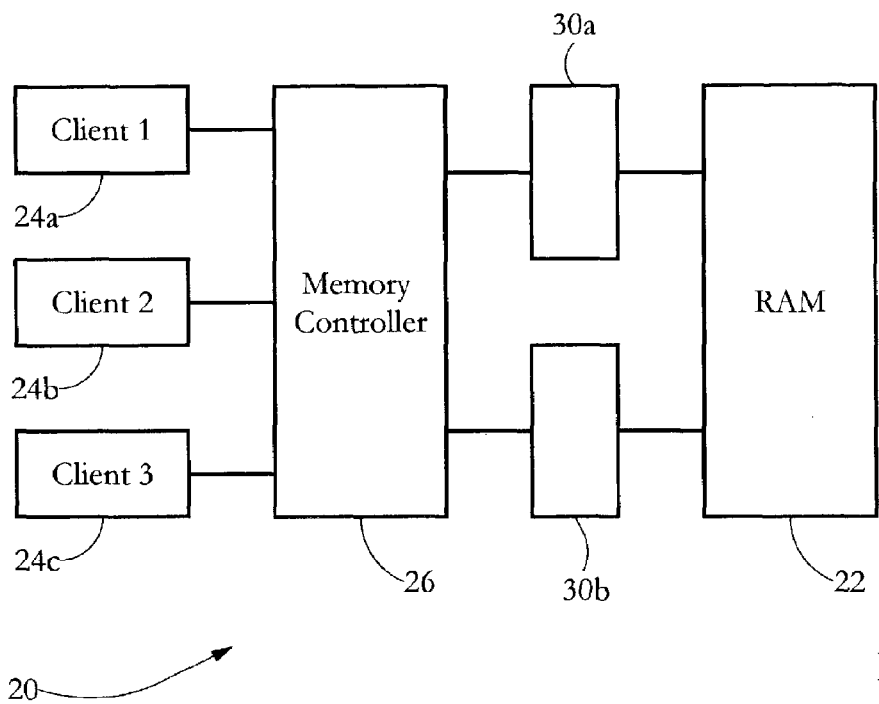
FIG. 1 is a high-level diagram of an exemplary data processing system of the present invention.

FIG. 1 is schematic diagram of an exemplary data processing system 20 according to the presently preferred embodiment of the present invention. Data processing system 20 includes a random access memory such as a conventional synchronous dynamic random access memory (SDRAM) 22, a plurality of clients 24*a–c*, and a memory controller 26 connecting clients 24*a–c* and memory 22, for controlling memory 22 according to requests received from clients 24*a–c*. Memory 22 is connected to memory controller 26 through conventional input and output (write and read) signal drivers 30*a–b*, respectively. Clients 24*a–c* can be special-purpose hardware modules, as well as programmed general-purpose logic. Memory 22 includes a plurality of independently-addressable banks, each of which is organized as a plurality of pages (rows). Each memory location within a bank is characterized by a row (page) address and a column address.

Figure 2:
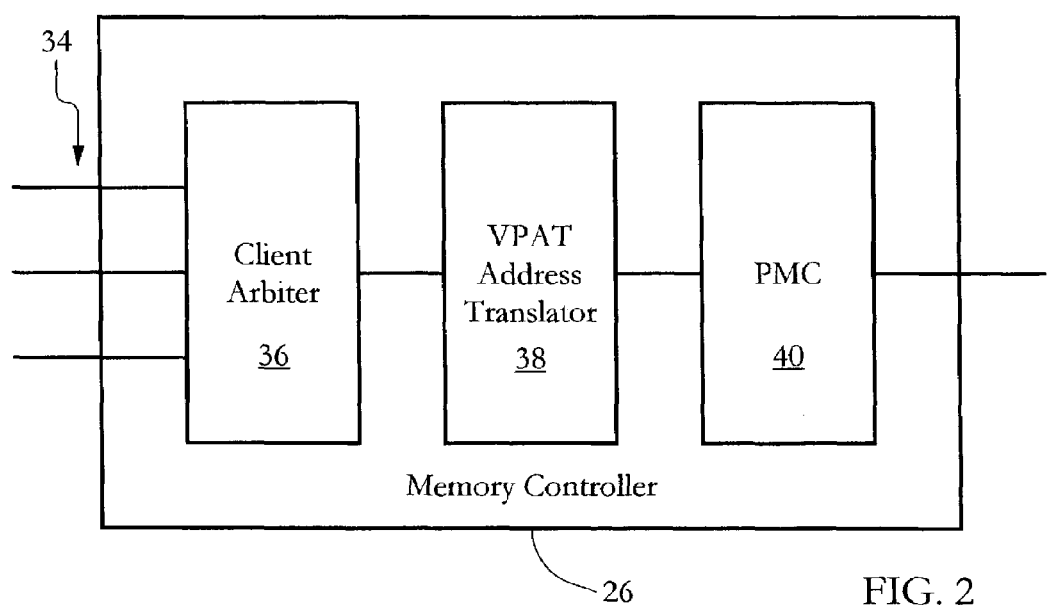
FIG. 2 shows a memory controller according to the preferred embodiment of the present invention.

FIG. 2 shows a diagram of memory controller 26 according to the preferred embodiment of the present invention. Memory controller 26 includes a client arbiter 36 capable of communication with plural clients 24*a–c*, a virtual-to-physical address translation (VPAT) unit 38 connected to client arbiter 36, and a physical memory controller (PMC) 40 connected to VPAT unit 38. PMC 40 is further connected to SDRAM 22.

Preferably, each of client arbiter 36, VPAT unit 38, and PMC 40 is preferably a data-driven core capable of communication with other cores according to a ready/request handshake protocol. In the preferred implementation, a token is transferred from a first core to a second core if and only if the first core asserts a ready signal to the second core, and the second core asserts a request signal to the first core on the same clock cycle (synchronously). For further information on the presently preferred ready/request protocol and core architecture see U.S. Pat. No. 6,145,073, herein incorporated by reference. Generally, client arbiter 36, VPAT unit 38 and PMC 40 could be interconnected using other desired protocols/connections.

Client arbiter 36 receives memory access (read/write) requests from plural clients, and arbitrates the requests. Client arbiter 36 may include appropriate buffers which can be allocated to different clients. Client arbiter 36 allows only one request at a time to proceed to VPAT unit 38, and attaches a client identification (ID) label to each request allowed to proceed. The client selection decision made by client arbiter 36 can be made according to a predetermined protocol, for example using a round-robin priority scheme. The client requests received by client arbiter 36 can have one of a plurality of virtual (client, logical) address formats, each corresponding to a mode of operation of memory controller 26. For example, modes such as linear, frame, field, and array can be useful for accessing stored video images. In linear mode, the client request includes a virtual (client) start address, a transaction length, and a transaction type (read/write). In frame mode, the client request can include start X and Y image coordinates, $\Delta X$ and $\Delta Y$ image extents, and a transaction type. The field mode is similar to the frame mode, except that only every other line in the image is accessed. In array mode, the client request includes a virtual start address, a transaction length, a stride, and a period number N. Such a request corresponds to accessing a transaction length following the start address, then skipping a stride minus transaction length to arrive at a new start address, and then repeating the above process N times.

VPAT unit 38 receives one client request at a time from client arbiter 36, breaks each block request (e.g. frame, field or array mode request) into a set of linear requests, and translates any virtual addresses from the client requests into physical addresses to be sent to PMC 40. A physical address can be equal to, for example, the sum of a function of the received virtual address (e.g. f(X,Y), where X and Y are start image coordinates) and a base address for the corresponding client, wherein each client has a different base address. VPAT unit 38 sends the resulting linear requests to PMC 40.

FIG. 3 shows the internal structure of PMC 40 according to the preferred embodiment of the present invention. PMC 40 includes an input interface pipestage 50a connected to VPAT unit 38 (shown in FIG. 2), and an output interface pipestage 50b connected to SDRAM 22 (shown in FIG. 1). PMC 40 further includes, sequentially between pipestages 50a–b: a transaction slicer 52, a command scheduler 54, a refresh finite state machine (RFSM) 58 and a plurality of bank status finite state machines (BFSM) 60, and a command arbiter 64. Each BFSM 60 corresponds to one memory bank. All blocks shown in FIG. 3 are data-driven pipestages (FSMs) interconnected according to the ready/request protocol described above. Input and output interface pipestages 50a–b are registered (Moore FSMs), and do not have combinational paths extending therethrough.

Transaction slicer 52 is connected to command scheduler 54 over a plurality of dedicated parallel slice connections 66. Each slice connection 66 is dedicated to carrying a predetermined transaction slice from slicer 52 to command scheduler 54, as explained in further detail below. Command scheduler 54 is connected to command arbiter 64 through a plurality of dedicated parallel connections 68, each corresponding to one BFSM 60 or RFSM 58. Each connection 68 connects command scheduler 54 to a corresponding BFSM 60 or RFSM 58, and on to command arbiter 64.

Transaction slicer 52 can receive complex memory transactions from VPAT unit 38, and slice each complex transaction into a plurality of tile- or page-optimized slices. Each slice contains a slice address, a transaction (slice) length, and a transaction type. Transaction slicer 52 determines an appropriate optimized slicing of each received complex transaction, and slices the transaction accordingly. Each slice is chosen such that the entire slice fits within a memory page or tile, wherein each page within a memory bank contains an integer ($2^n$, $n \geq 0$) number of tiles.

Tiling can be better understood by considering two potential correspondences between logical address and physical memory location for an exemplary digital video image 80 illustrated in FIGS. 4-A and 4-B. In a non-tiled memory arrangement, illustrated in FIG. 4-A, the digital video image can be stored sequentially by image row and column, and by memory page and bank. For example, storage starts at the top left corner of the image, and continues in sequence left-to-right and top-down across the entire image. When the first page within the first memory bank is full, storage moves on to the first page in the second bank. When the first segment (collection of corresponding first pages within all the banks) is full, storage moves on to the second page within the first memory bank, and so on. Each part of image 80 that is stored within the same page of the same bank is represented in FIG. 4-A by a rectangle 82. Rectangles 82 are shown for general illustrative purposes, and are not necessarily to scale.

In a tiled memory arrangement, illustrated in FIG. 4-B, the image 80 is broken into a plurality of rectangle-shaped, page-optimized tiles 86. Each tile 86 fits entirely within one page of a memory bank, and the tiles are ordered such that any two adjacent tiles correspond to either the same page within a memory bank, or to different memory banks. The top left corner of image 80 can be stored at the first memory location within the first page. Storage then moves left-to-right and top-to-bottom across the first tile, and then on across the next tile, and so on. Consider an arbitrary group of four adjacent tiles, such as group 88 shown in FIG. 4-B. Any pair of adjacent tiles will have their data stored either in the same page within the same bank, or within different banks. In general, the size of the tiles can be chosen such that $2^n$ ($n \geq 0$) tiles fit within a memory page within a bank, as illustrated by the four-tile group 88 (for n=2). Preferably, each tile is sized to fit exactly within one page within a bank.

Consider a client memory request for accessing an arbitrary subimage 90 contained within image 80. In the linear, non-tiled configuration shown in FIG. 4-A, consecutive image lines within subimage 90 can be stored in different pages of the same memory bank. Since accessing different pages within the same bank involves a relatively long delay for opening and closing each page, the non-tiled configuration of FIG. 4-A can lead to suboptimal SDRAM bandwidth utilization, particularly if all memory commands are processed in order. By contrast, in the tiled configuration shown in FIG. 4-B, accessing subimage 90 does not require consecutive access to different pages within the same bank, since any adjacent tiles will not have their data stored within different pages of the same bank.

Referring to FIG. 3, command scheduler 54 receives multiple tile- or page-optimized slices sent by slicer 52, and schedules the slices out of order if needed to minimize latency. Each slice is effectively pre-assigned to a particular bank by the slice start address. Command scheduler 54 looks ahead a certain number (e.g. 8) of slices before transmitting a slice to its corresponding BFSM 60. Command scheduler 54 also receives bank status information provided by BFSMs 60, which indicates the current page opened within each bank, and which SDRAM commands the bank is ready to execute. Standard SDRAM timing constraints may prevent the execution of some commands at a given time. Command scheduler 54 then generates SDRAM control commands (Activate, Precharge, Read, Write) required to execute the memory transactions corresponding to each slice.

Command scheduler 54 can send pre-read/write (Activate and Precharge) commands for a slice before the corresponding pre-read/write commands for a previously received slice, if such command re-ordering allows a reduction in SDRAM latency. Preferably, in order to eliminate the need for extra buffering, command scheduler 54 ensures that all read and write commands sent out are in order, notwithstanding any re-ordering of pre-read/write commands. Requiring in-order read and write commands ensures that the client receives or stores requested data in order. Command scheduler 54 sends the SDRAM control commands to each corresponding BFSM 60. A priority is assigned to each command, in order to arbitrate for SDRAM access and to preserve the Read and Write order of execution. Only the instruction with the highest priority can execute a Read or a Write command, as described below.

Refresh control FSM (RFSM) 58 periodically generates memory refresh commands for refreshing the SDRAM banks. BFSMs 60 receive memory access commands from command scheduler 54, transmit the commands to command arbiter 64, and send SDRAM status information to command scheduler 54. Command arbiter 64 allows only one of FSMs 58, 60 to send commands to the SDRAM at any given time, according to a priority scheme which takes into account the refresh requirements of the SDRAM and the command priorities assigned by the command scheduler to different slice commands. For example, RFSM 58 can be set to have a higher priority than BSFMs 60 if needed, in order to ensure that RFSM 58 is able to transmit sufficient refresh commands to prevent loss of data from the SDRAM.

Figure 5:
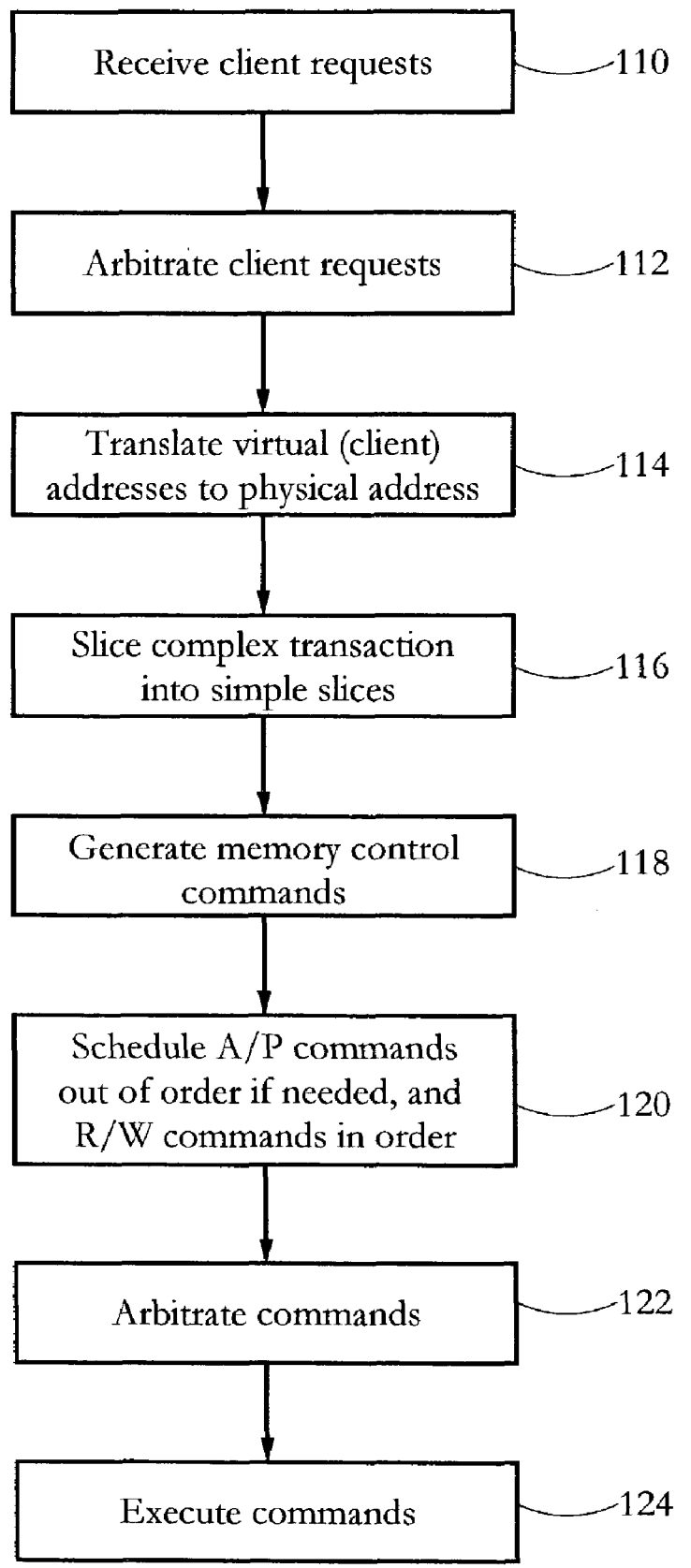
FIG. 5 is a flowchart showing the preferred steps performed by the system of FIG. 1, and in particular the memory controller of FIG. 2.

FIG. 5 is a flowchart summarizing the above-described steps performed by a data processing system according to the preferred embodiment of the present invention. The structures corresponding to the steps shows in FIG. 5 are illustrated in FIGS. 2–3. In a first step 110, read/write client requests are received by client arbiter 36 (shown in FIG. 2). Client arbiter 36 arbitrates the client request order (step 112), and sends each request to VPAT unit 38. VPAT unit 38 translates the virtual addresses provided by the clients to physical memory addresses (step 114), and sends the transactions containing physical memory addresses to PMC 40.

Slicer 52 (shown in FIG. 3) receives the transactions from VPAT unit 38, slices each transaction (if needed) into simple, page-optimized slices (step 116 in FIG. 5), and sends the slices on to command scheduler 54. Command scheduler 54 generates required memory control commands (step 118), and schedules the memory commands (step 120). Pre-read/write commands can be scheduled out of order if needed to minimize the SDRAM latency, but read/write commands are preferably scheduled in order. Command arbiter 64 arbitrates the commands, allowing only one of FSMs 58, 60 send a command to the SDRAM at any given time, and ensuring that the read/write commands received by the SDRAM are in order (step 122). Finally, in step 124, the SDRAM commands are executed by SDRAM 22 (shown in FIG. 1). Data is preferably retrieved from or sent to buffers 30a–b in order.

FIGS. 6-A and 6-B illustrates exemplary sequences of memory transactions performed over 26 clock cycles 200 according to the present invention, for an SDRAM with a CAS latency of 3. The CAS latency of a DRAM characterizes the number of clock cycles that must pass between a read command and the receipt of data from the DRAM. Memories with different CAS latencies (e.g. 1 or 2) can be used in the present invention. FIG. 6-A shows an exemplary sequence for a memory controller that is capable of reordering preparatory commands such as activate and precharge, but keeps the read and write commands in order. FIG. 6-B shows an exemplary sequence for a memory controller capable of reordering read and write commands as well as activate and precharge commands. The illustrated sequences correspond to 4 client read requests or tokens $T_{0-3}$ 202. The token subscripts 0–3 refer to the token order assigned by client arbiter 36 (shown in FIG. 2). The descriptions of tokens 202 are shown in FIGS. 6-A–B at 204. The commands sent by command scheduler 54 to BFSMs 60 (shown in FIG. 3) are shown at 206, 306 in FIGS. 6-A–B, respectively, where $S_{0-5}$ denote six slices. The commands actually executed are shown in bold. The status of each SDRAM bank is shown at 208 and 308, respectively, in FIGS. 6-A and 6-B. The SDRAM commands received by the SDRAM 22 from memory controller 26 (FIG. 1) are shown at 220 and 320, respectively, while the data sequences read from SDRAM 22 are shown at 224, 324, respectively. The numbers in sequences 220, 320, 224 and 324 denote the SDRAM bank corresponding to each command/datum.

In slice command sequences 206, slices $S_{0-3}$ correspond to read request (token) $T_0$, slice $S_4$ corresponds to token $T_1$, slice $S_5$ to token $T_2$, and the last slice $S'_0$ corresponds to token $T_3$. Command sequence 206 illustrates out-of-order precharge and activation controlled by command scheduler 54: a precharge (P) command for slice $S_5$ occurs on clock cycle #10, two clock cycles before a precharge command for slice $S_4$; and an activate (A) command for slice $S_5$ occurs on clock cycle #13, two clock cycles before an activate command for slice $S_4$. As shown in FIG. 6-A, the priority tags associated with the read (R) commands of slices $S_4$ and $S_5$ ensure that the read command for slice $S_4$ is executed on clock cycle #18, two clock cycles before the read command for slice $S_5$.

As shown in the data sequence 224 of FIG. 6-A, the data transfer is stalled (St) at clock cycle #20. The stall cycle occurs because the read command for bank B1 must wait until cycle #18, two cycles after its corresponding activate command, as illustrated in sequences 206, 208. If the read commands are to be in the original client-determined order, then the read command for bank B1 must occur before the read command for bank B0, even though the read command for bank B0 would otherwise be ready for execution earlier.

Stall cycles such as the one described above can be eliminated by allowing the reordering of the read and write commands, in addition to the reordering of activate and precharge commands. FIG. 6-B illustrates exemplary command and data sequences 306, 308, 320, 324 corresponding to the same tokens 202 shown in FIG. 6-A, if reordering of the read and write commands are allowed. Sequences 306, 308, 320, and 324 differ from the corresponding sequences 206, 208, 220 and 224 starting with clock cycle #15. As illustrated in the command sequence 308, the read command (R) for bank B0 executes on clock cycle #17, two cycles before the subsequent read command for bank B1. For comparison, the corresponding read command for bank B0 in FIG. 6-A executes on clock cycle #20 in sequence 208, two cycles after the corresponding read command for bank B1. The elimination of the stall cycle allows shortening the data sequence 324 by one cycle to 24 cycles, relative to the data sequence 224. Allowing reordering of the read and write commands is preferably implemented using appropriate additional buffering within command scheduler 54 (shown in FIG. 3). Alternatively, additional buffers for performing read/write reordering can be implemented in other parts of the memory control system, for example as part of client arbiter 36 (see FIG. 2). Such buffers may introduce additional latency to the memory access operations.

It will be clear to one skilled in the art that the above embodiments may be altered in many ways without departing from the scope of the invention. For example, while the preceding discussion has used video images to illustrate the present invention, the above-described systems and methods are applicable to a variety of applications other than digital video processing, such as communications or general purpose computing. The above-described functionality can be implemented in many different ways. For example, interface protocols other than the presently preferred rdy/req handshake protocols may be used. Different component modules can be combined into a single module. Suitable multi-bank RAMs include conventional DRAM, SDRAM, DDR-DRAM, and other types of random access memory. Accordingly, the scope of the invention should be determined by the following claims and their legal equivalents.

What is claimed is:

1. A data processing system comprising:
a data processing client;
a random access memory for performing a memory operation in response to a client request made by the client, the memory including a plurality of banks, each of the banks including a plurality of pages; and
a memory controller connected to the client and the memory, for controlling the memory to perform the memory operation according to the client request, wherein the memory controller comprises
slicing logic for slicing a complex memory access request derived from the client request into a plurality of simple memory access requests having a first order, each simple request corresponding to a set of memory addresses within a single page within one of the banks, the complex request corresponding to more than one page, the plurality of simple requests including a plurality of preparatory parts and a corresponding plurality of memory access parts, each simple request including a preparatory part and a memory access part; and
command ordering logic connected to the slicing logic, for controlling an ordering of the plurality of preparatory parts in a second order different from the first order, and an ordering of the plurality of memory access parts in the first order.

2. The system of claim 1, wherein each preparatory part comprises a command selected from an activate command and a precharge command.

3. The system of claim 2, wherein each memory access part comprises a command selected from a read command and a write command.

4. The system of claim 1, further comprising:
assigning a priority to at least part of each of the simple requests; and
arbitrating a transmission of the at least part of each of the simple requests to the memory according to the priority.

5. The system of claim 1, wherein:
the system comprises a plurality of data processing clients connected to the memory controller; and
the memory controller further comprises client arbitration logic connected to the clients, for arbitrating a plurality of memory access requests received from the clients.

6. The system of claim 5, wherein the memory controller further comprises virtual-to-physical address translation logic connected to the client arbitration logic and slicing logic, for receiving a plurality of virtual memory access commands from the client arbitration logic, translating the virtual memory access commands into a corresponding plurality of physical memory access commands, and transmitting the plurality of physical memory access commands to the slicing logic.

7. The system of claim 1, wherein the random access memory comprises a dynamic random access memory.

8. The system of claim 7, wherein the dynamic random access memory comprises a synchronous dynamic random access memory.

9. The system of claim 8, wherein the synchronous dynamic random access memory comprises a double data rate synchronous random access memory.

10. A random access memory controller for controlling a random access memory comprising a plurality of banks according to commands received from a plurality of clients, comprising:
slicing logic for slicing a complex memory access request derived from a client request into a plurality of simple memory access requests having a first order, each simple request corresponding to a set of memory addresses within a single page within one of the plurality of banks, the complex request corresponding to more than one page within the random access memory, the plurality of simple requests including a plurality of preparatory parts and a corresponding plurality of memory access parts, each simple request including a preparatory part and a memory access part; and
command ordering logic connected to the slicing logic, for controlling an ordering of the plurality of preparatory parts in a second order different from the first order, and an ordering of the plurality of memory access parts in the first order.

11. The controller of claim 10, wherein each preparatory part is selected from an activate and a precharge command.

12. The controller of claim 11, wherein each memory access part is selected from a read and a write command.

13. The controller of claim 10, further comprising:
assigning a priority to at least part of each of the simple requests; and
arbitrating a transmission of the at least part of each of the simple requests to the memory according to the priority.

14. A dynamic random access memory controller for controlling a dynamic random access memory comprising a plurality of banks, each bank including a plurality of pages, the memory controller comprising:
a client arbiter for ordering a plurality of client memory access requests, each request including a virtual memory address;
a virtual to physical address translation unit connected to the client arbiter, for translating the virtual memory address to a physical memory address, thereby generating a complex memory transaction;

a transaction slicer connected to the virtual to physical address translation unit, for slicing the complex memory transaction into a plurality of simple transaction slices, each simple transaction slice corresponding to a set of memory addresses within a single page within one of the banks, the complex transaction corresponding to more than one page within the dynamic random access memory;

a command scheduler connected to the transaction slicer, for generating a plurality of physical memory commands derived from the transaction slices, wherein the command scheduler is capable of reordering a set of preparatory memory commands in an order different from an order of the transaction slices, while ordering a set of memory access commands corresponding to the set of preparatory memory commands in the order of the transaction slices; and a command arbiter connected to the command scheduler and to the dynamic random access memory, for allowing only one memory command received from the command scheduler to be transmitted to the dynamic random access memory at any time.

15. A random access memory control method comprising:

slicing a complex memory access request into a plurality of simple memory access requests having a first order, each simple request corresponding to a set of memory addresses within a single page within one bank of a multi-bank random access memory, the complex request corresponding to more than one page within the random access memory, the plurality of simple requests including a plurality of preparatory parts and a corresponding plurality of memory access parts, each simple request including a preparatory part and a memory access part; and controlling an ordering of the plurality of preparatory parts in a second order different from the first order, and an ordering of the plurality of memory access parts in the first order.

16. The method of claim 15, wherein each preparatory part comprises a command selected from an activate command and a precharge command.

17. The method of claim 16, wherein each memory access part comprises a command selected from a read command and a write command.

18. The method of claim 15, further comprising:

assigning a priority to at least part of each of the simple requests; and arbitrating a transmission of the at least part of each of the simple requests to the memory according to the priority.

19. A data processing system comprising:

at plurality of clients for generating a plurality of client requests; and a random access memory controller connected to the plurality of clients and comprising command reordering logic configured to receive a plurality of memory access requests derived from die plurality of client requests, the plurality of memory access requests having a first order, each memory access request including a preparatory part and a memory access part, the command reordering logic being configured to control an ordering of a set of preparatory parts in a second order different from the first order, and an ordering of a set of memory access parts corresponding to the set of preparatory parts in the first order.

* * * * *